United States Patent [19]

Bell, Jr. et al.

[11] 4,319,114
[45] Mar. 9, 1982

[54] CURRENT LIMIT SYSTEM FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp, New York, N.Y.

[21] Appl. No.: 68,461

[22] Filed: Aug. 21, 1979

[51] Int. Cl.³ .............................................. B23P 1/02
[52] U.S. Cl. ............................ 219/69 C; 219/69 P
[58] Field of Search ............... 219/69 C, 69 S, 69 P, 219/69 M

[56] References Cited

U.S. PATENT DOCUMENTS 4,071,729  1/1978  Bell, Jr. ................................ 219/69 C Primary Examiner—C. C. Shaw
Attorney, Agent, or Firm—Harry R. Dumont

[57] ABSTRACT

A programmable system for controlling maximum machining current. A current limit is entered into the system together with the on time and off time desired. The system operates to use the entered on-time and current values, but the off time will be modified depending on the maximum current limit possible. This will protect the apparatus when an impossible combination has been entered by the operator. The duty cycle is checked against a maximum level such as 87% or a like upper limit.

7 Claims, 2 Drawing Figures

CURRENT LIMIT SYSTEM FOR ELECTRICAL DISCHARGE MACHINING APPARATUS

BACKGROUND OF THE INVENTION

The field to which the present invention relates is that generally known as electrical discharge machining, sometimes hereinafter referred to as EDM, in which material is removed from an electrically conductive workpiece by the action of electrical gap discharges occurring between a tool electrode and a workpiece. A dielectric coolant fluid is circulated and recirculated through the gap, usually under pressure, throughout the machining operation. An electrode or a workpiece servo feed system is used to provide relative movement and thus maintain an optimum gap spacing between the electrode and the workpiece as the workpiece material is being removed.

It is important to the process of EDM that the machining power pulses provided at the gap are of closely and precisely controllable on-off time and frequency to insure repeatability of results and to provide appropriate cutting action for the type of operation being carried on. Various types of pulse generators which have this capability have been developed and are in commercial use for EDM. One commonly used type of EDM power supply includes as a principal part of its machining power pulse generator an astable multivibrator in which on-off time and frequency are controlled and preset by a ganged capacitor and resistor arrangement. One example of this type of pulse generator and an associated protection system is shown and described in Kurt H. Sennowitz, U.S. Pat. No. 3,649,802, issued on Mar. 14, 1972 for "Protective System for Electrical Discharge Machining Power Supply Circuit", which patent is of common ownership herewith.

A further arrangement for digital type EDM pulse generator is shown and described in Oliver A. Bell, Jr., U.S. Pat. No. 3,809,847, issued on May 7, 1974, for "Method and Apparatus for Electrical Discharge Machining".

A still further type of digital multivibrator is shown and described in Oliver A. Bell, Jr., U.S. Pat. No. 4,071,729, issued on Jan. 31, 1978, for "Adaptive Control System and Method for Electrical Discharge Machining". This patent shows an on and off time generator which receives inputs from a programmable computer and from this general arrangement provides machining power pulses to the machining gap. All the above noted patents are of common ownership herewith.

The present invention is particularly designed for use with a digital type pulse generator that is controlled by a programmable computer or similar input device. Reference is made to our copending U.S. Patent Application Ser. No. 068,328 filed on Aug. 21, 1979 for "Programmable Pulse Generator for Electrical Discharge Machining Apparatus".

The prior art has shown a number of current limiting systems for EDM in which a current limit is relay set in accordance with the frequency at which the pulse generator is operating. The present invention goes further and allows on and off times and current limit to be entered. The off time is then readjusted to an allowable maximum value for the current limit desired.

SUMMARY OF THE INVENTION

Our invention provides a current limit system for EDM which operates to receive the on time and the off time preset by the operator. The duty cycle is computed and checked against a maximum level, for example 87%. If it is greater, the off time is increased by the amount required to reach that level. The off time is checked against a predetermined value, for example 255 microseconds. If it is greater, no current limiting is needed. Maximum allowable frequency is checked against a table of predetermined values.

BRIEF DESCRIPTION OF THE DRAWINGS

The present invention, its operation, features and advantages, and the advancements which it affords will be understood from the following specification together with the drawings in which like numerals are used to refer to similar or like parts where they occur, and wherein.

DETAILED DESCRIPTION OF THE PREFERRED EMBODIMENT

Figure 1:
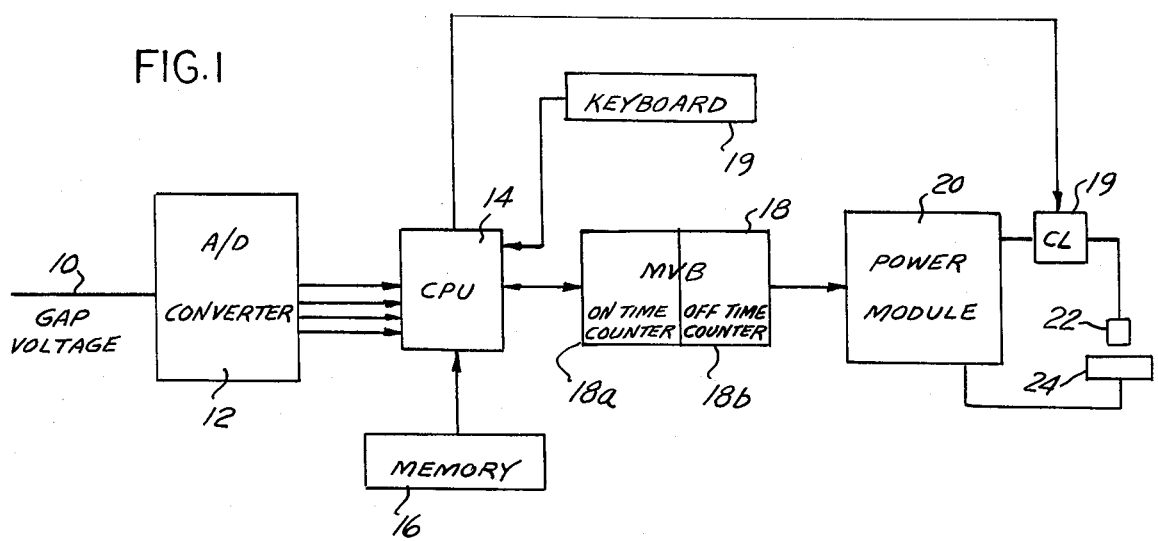
FIG. 1 is a block diagrammatic showing of the system with which our invention is used.

FIG. 1 shows the basic parts of a programmable computer and an associated electrical discharge machining apparatus. Gap voltage is sensed by a voltage sensing network 10. The gap voltage is passed through an analog to digital converter 12 and then to the CPU 14 of the programmable computer. The memory 16 of the microprocessor is also shown. One example of a microprocessor suitable for use in connection with this invention is the microprocessor currently manufactured and sold by the Mostek Corporation, 1215 West Crosby Road, Carrollton, Tex. 75006 and known as the Model MK 3880. It will be understood that parts of the microprocessor can be reconstructed using architecture of the type of the Texas Instruments model 74181 or the 74S181 or the 74LS181 series of four bit slice arithmetic logic units. These units are known in the electronic art and are used to simplify operations such as add, subtract, find equality, negate and still others.

Also shown in FIG. 1 is a digital pulse generator 18 of the counter type as shown and described in our co-pending application Ser. No. 068,328 referred to above. Keyboard 19 is used for operator input. One counter 18a is preset to represent machining pulse on-time. The other counter 18b is preset to represent machining pulse off-time. A current limit unit 19 is connected in circuit with the gap and associated with the power module 20. It includes a plurality of relays, six in number, which corresponding to their actuation switch a set of resistors in series with the gap lead to actually limit machining current. The six relays in binary fashion give a total of 64 current limit positions. This will be explained more completely hereinafter. The EDM power output module is indicated by the numeral 20 and further includes the main DC source and an output power switch that is turned on and off by the pulse generator 18 to provide machining power pulses to the machining gap. The machining gap is defined between a tool electrode 22 and a workpiece 24. The gap voltage signal is shown at the left hand side of the drawing. It is used in the pulse generator 18 to control the off time in a manner that will be further explained in the section "Description of Operation", hereinafter. It will further be clarified by inclusion of an exemplary program for the microprocessor.

Figure 2:
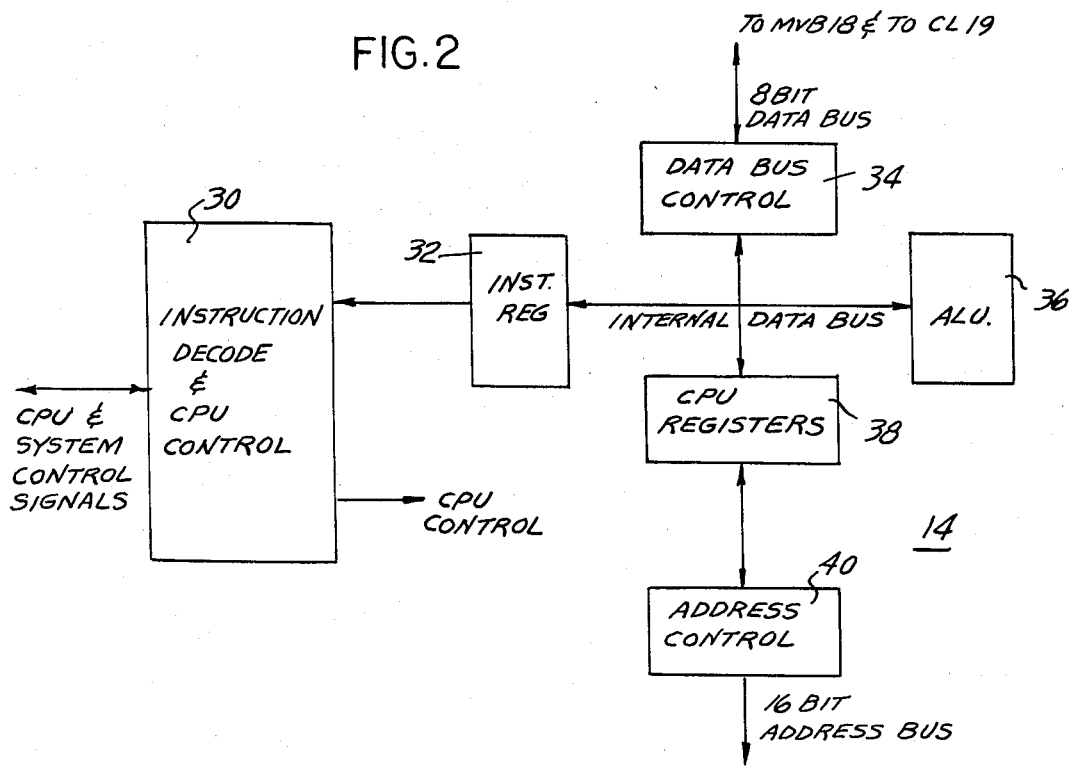
FIG. 2 is a block diagrammatic drawing illustrating one type of programmable computer or microprocessor used with the present invention.

FIG. 2 is a block diagram of the major elements in the CPU 14. These include the CPU Control 30, internal register 32, data bus control 34, arithmetic logic unit 36, CPU registers 38, and address control 40. The several interfaces and data buses are also shown in the drawing. While the described embodiment of the invention includes elements of a microprocessor, the invention is not limited to this type of device. A variety of different programmable computers can be used.

DESCRIPTION OF OPERATION

The current limit, on time and off time data are entered in the keyboard 19 by the operator. The entry is made into the CPU 14 and the pulse generator 18. The on-time and current limit value will always be entered as preset by the operator. However, the off time is subject to modification depending on the duty cycle and frequency. An impossible machining combination of frequency and current limit will not be allowed to operate. In the absence of control by the current limit system, the workpiece, electrode and EDM circuitry could be damaged.

Basically, our system receives the on and off time and derives the duty cycle. If it exceeds 87%, which represents the maximum safe level, then it will be reduced by increasing the off time until the duty cycle is 87% or less. After that operation is performed, we check the total period to see if it is greater than 255 microseconds. If it is, no current limiting action is necessary since any period greater than 255 with an 87% duty cycle will permit any of the current limit combinations.

If the period is less than 255, then we will subtract the number 20 from it. If the result is greater than 20, we retire our routine. If the period desired is less than 20, we must start checking our look up table to verify we don't have a frequency combination that is too great for the current limit desired. The look up table, illustrated in the manner it is used in an exemplary program, is set forth below and entitled, "Current Limit Table".

| | CURRENT LIMIT TABLE | | |
|---|---|---|---|
| 02888 | | CLTAB | MBYTE 3,8 |
| | 109C 03 | + | BYTE 3 |
| | 109D 03 | + | BYTE 3 |
| | 109E 03 | + | BYTE 3 |
| | 109F 03 | + | BYTE 3 |
| | 10A0 03 | + | BYTE 3 |
| | 10A1 03 | + | BYTE 3 |
| | 10A2 03 | + | BYTE 3 |
| | 10A3 03 | + | BYTE 3 |
| 02889 | | | MBYTE 4,2 |
| | 10A4 04 | + | BYTE 4 |
| | 10A5 04 | + | BYTE 4 |
| 02890 | | | MBYTE 5,2 |
| | 10A6 05 | + | BYTE 5 |
| | 10A7 05 | + | BYTE 5 |
| 02891 | | | MBYTE 6,2 |
| | 10A8 06 | + | BYTE 6 |
| | 10A9 06 | + | BYTE 6 |
| 02892 | 10AA 07 | | BYTE 7 |
| 02893 | | | MBYTE 8,2 |
| | 10AB 08 | + | BYTE 8 |
| | 10AC 08 | + | BYTE 9 |
| 02894 | | | MBYTE 9,2 |
| | 10AD 09 | + | BYTE 9 |
| | 10AE 09 | + | BYTE 9 |
| 02895 | | | MBYTE 10,3 |
| | 10AF 0A | + | BYTE 10 |

-continued

| | CURRENT LIMIT TABLE | | |
|---|---|---|---|
| | 10B0 0A | + | BYTE 10 |
| | 10B1 0A | + | BYTE 10 |
| 02896 | | | MBYTE 11,3 |
| | 10B2 0B | + | BYTE 11 |
| | 10B3 0B | + | BYTE 11 |
| | 10B4 0B | + | BYTE 11 |
| 02897 | | | MBYTE 12,3 |
| | 10B5 0C | + | BYTE 12 |
| | 10B6 0C | + | BYTE 12 |
| | 10B7 0C | + | BYTE 12 |
| 02898 | | | MBYTE 13,2 |
| | 10B8 0D | + | BYTE 13 |
| | 10B9 0D | + | BYTE 13 |
| 02899 | | | MBYTE 14,4 |
| | 10BA 0E | + | BYTE 14 |
| | 10BB 0E | + | BYTE 14 |
| | 10BC 0E | + | BYTE 14 |
| | 10BD 0E | + | BYTE 14 |
| 02900 | | | MBYTE 15,3 |
| | 10BE 0F | + | BYTE 15 |
| | 10BF 0F | + | BYTE 15 |
| | 10C0 0F | + | BYTE 15 |
| 02901 | | | MBYTE 16,4 |
| | 10C1 10 | + | BYTE 16 |
| | 10C2 10 | + | BYTE 16 |
| | 10C3 10 | + | BYTE 16 |
| | 10C4 10 | + | BYTE 16 |
| 02902 | | | MBYTE 17,3 |
| | 10C5 11 | + | BYTE 17 |
| | 10C6 11 | + | BYTE 17 |
| | 10C7 11 | + | BYTE 17 |
| 02903 | | | MBYTE 18,6 |
| | 10C8 12 | + | BYTE 18 |
| | 10C9 12 | + | BYTE 18 |
| | 10CA 12 | + | BYTE 18 |
| | 10CB 12 | + | BYTE 18 |
| | 10CC 12 | + | BYTE 18 |
| | 10CD 12 | + | BYTE 18 |
| 02904 | | | MBYTE 19,13 |
| | 10CE 13 | + | BYTE 19 |
| | 10CF 13 | + | BYTE 19 |
| | 10D0 13 | + | BYTE 19 |
| | 10D1 13 | + | BYTE 19 |
| | 10D2 13 | + | BYTE 19 |
| | 10D3 13 | + | BYTE 19 |
| | 10D4 13 | + | BYTE 19 |
| | 10D5 13 | + | BYTE 19 |
| | 10D6 13 | + | BYTE 19 |
| | 10D7 13 | + | BYTE 19 |
| | 10D8 13 | + | BYTE 19 |
| | 10D9 13 | + | BYTE 19 |
| | 10DA 13 | + | BYTE 19 |
| 02905 | 10DB 14 | | BYTE 20 |

If the position in the table has a frequency greater than the frequency that has been calculated for the current on-off time settings, then no action is required. If it is less than the current frequency desired, then we must make an adjustment of the off time to meet that frequency. As an example, if you have current limit 10 and an on time 8 and off time 2, the resultant frequency would be 100 KHZ and no change to off time would be required.

If we input an on time of 2 and an off time of 1, the total period would be 3 microseconds and the frequency 333 KHZ. Referring to the current limit table above, with current limit 7, we allow for only 3 microseconds period. With current limit 9, we allow only 4 microseconds period. The progression is in this manner from a current limit of 1 on top to a current limit of 64 on the bottom of the table.

An example will now be taken which will require corrective action and change to off time. We have an operator input of 2 microseconds on time, 2 microseconds off time and a current limit of 25. We find in the table in the 25th position, the number 11, which indicates that 11 microseconds is the smallest allowable period for current limit 25. Since we have set 2 on and 2 off, this is an impossible combination. It is now necessary to modify the off-time so that the total of the off-time and the on-time will equal 11 or more. We then leave the value of the on time as it was preset, take the period and subtract it from the 11 to give 7. The 7 is added back to the off time so to set the correct off time for the operation. The current limit will be output through an appropriate port to operate the right relays in current limit unit 19 and set the proper current limit for the output from power module 20. At the same time, the on-time and off-time are entered from the CPU 14 to counters 18a and 18b respectively in the pulse generator 18. As a result, we have an on and off setting and a current limit that have been properly checked and are all protective of the EDM apparatus and of the workpiece 24 and tool electrode 22. We have not violated the operator's parameters for finish and overcut since he has been given the exact current limit and on-time that he asked for. To further clarify the mode of operation of the invention, an exemplary program showing the current limit protection system is set forth below.

means for predetermining and storing a plurality of allowable total period data, one for each of the current limit settings in an ordered table;

means for making an initial check to determine if the total period is greater than a maximum predetermined amount thus to permit any of the current limit settings and accordingly inhibiting further current limit checking;

means for comparing the period of the preselected on-off time combination less than said maximum predetermined amount to the table value; and means for increasing the off time to the maximum allowable table value for the preselected current limit magnitude and entering said on and off times in said pulse generator.

2. The combination as set forth in claim 1 wherein said table of values is entered in a computer memory for storing.

3. The combination as set forth in claim 1 wherein said means for preselecting includes an operator keyboard.

4. The combination as set forth in claim 1 wherein said on and off time control means comprises an on time counter and an off time counter.

| | | Current Limit Program | |
|---|---|---|---|
| 01377 04A0 2A0320 > | OFFIX | LD HL, (OFTIM) | GET OFFTIME |
| 01378 04A3 EB | | EX DE,HL | PUT OFFTIME IN D & E |
| 01379 04A4 2A0520 > | | LD HL,(ONTIM) | GET ON TIME |
| 01380 04A7 44 | | LD B,H | PUT THE ONTIME IN B & C |
| 01381 04A8 4D | | LD C,L | BC = ONTIME |
| 01382 04A9 CDC503 > | | CALL CAL | CORRECT FOR 87% DUTY CYCLE |
| 01383 | | ZCR H | IF PERIOD IS - 255 THEN NO ACTION |
| 04AC 24 + | | INC H | |
| 04AD 25 + | | DEC H | |
| 01384 04AE C0 | | RET NZ | H HAD A NUMBER SO PERIOD - 255 |
| 01385 04AF 7D | | LD A,L | CHECK LOWER 8 BITS |
| 01386 04B0 D614 | | SUB 20 | SEE IF PERIOD IS - 20 |
| 01387 04B2 D0 | | RET NC | NO OVERFLOW SO PERIOD - 20 |
| 01388 04B3 3A0A20 > | | LD A,(CTWR) | GET CONTROL WORK (CURRENT LIMIT,CYST BIT, POL BIT) |
| 01389 04B6 E63F | | AND 3FH | MASK OFF POLARITY BIT AND CYCLE START BIT |
| 01390 04B8 55 | | LD D,L | SAVE PERIOD IN D |
| 01391 04B9 219C10 > | | LD HL,CLTAB | HL POINTS TO TOP OF CURRENT LIMIT TABLE |
| 01392 04BC 0600 | | LD B,0 | CLEAR B |
| 01393 04BE 4F | | LD C,A | BC CONTAINS THE CURRENT LIMIT |
| 01394 04BF 09 | | ADD HL,BC | OFFSET TABLE POINTER |
| 01395 04C0 46 | | LD B,(HL) | GET ALLOWABLE PERIOD |
| 01396 04C1 7A | | LD A,D | GET DESIRED PERIOD |
| 01397 04C2 90 | | SUB B | SUBTRACT MAX ALLOWABLE FREQ |
| 01398 04C3 D0 | | RET NC | NO OVERFLOW INDICATES ALL OK |
| 01399 04C4 78 | | LD A,B | GET CORRECT PERIOD |
| 01400 04C5 92 | | SUB D | GET DIFFERENCE |
| 01401 04C6 B7 | | OR A | CLEAR CARRY |
| 01402 04C7 8B | | ADC A,E | ADD OLD OFFTIME |
| 01403 04C8 320320 > | | LD (OFTIM),A | STORE NEW OFFTIME |
| 01404 04CB C9 | | RET | DONE |

It will thus be seen that we have provided by our invention, an improved current limit system that controls operator input to the degree necessary to protect the equipment. The system operates precisely and reliably without interferring with parameters affecting the important factors of finish and overcut. These remain as selected by the operator.

We claim:

1. A current limit system for electrical discharge machining apparatus, comprising means for controlling gap current; a pulse generator including an on time and an off time control means, comprising:

means for preselecting values representative of on and off time and of a current limit magnitude setting;

5. A current limit system for electrical discharge machining apparatus, comprising:

means for controlling magnitude of gap current flow, a pulse generator for the apparatus having an on time counter and an off time counter;

means for preselecting values representative of on and off time and of current limit setting;

means for predetermining and storing a plurality of maximum allowable total period data, one for each current limit setting in an ordered table;

means for predetermining a maximum allowable total period;

means for initially checking said maximum allowable total period against the period of the selected on-off time;

means for enabling the further operation of the system only if the selected period is less than such maximum allowable total;

means for comparing the period of the preselected on-off time period to the corresponding table value;

means for increasing the off time to increase the total period to the maximum allowable table data for the preselected current limit setting; and means for entering said on time and modified off time in said pulse generator.

6. The combination as set forth in claim 5 wherein said means for controlling magnitude of gap current comprises a relay operated variable current network in the EDM gap circuit.

7. The combination as set forth in claim 5 wherein said means for preselecting comprises an operator keyboard.

* * * * *